UNITED STATES PATENT OFFICE.

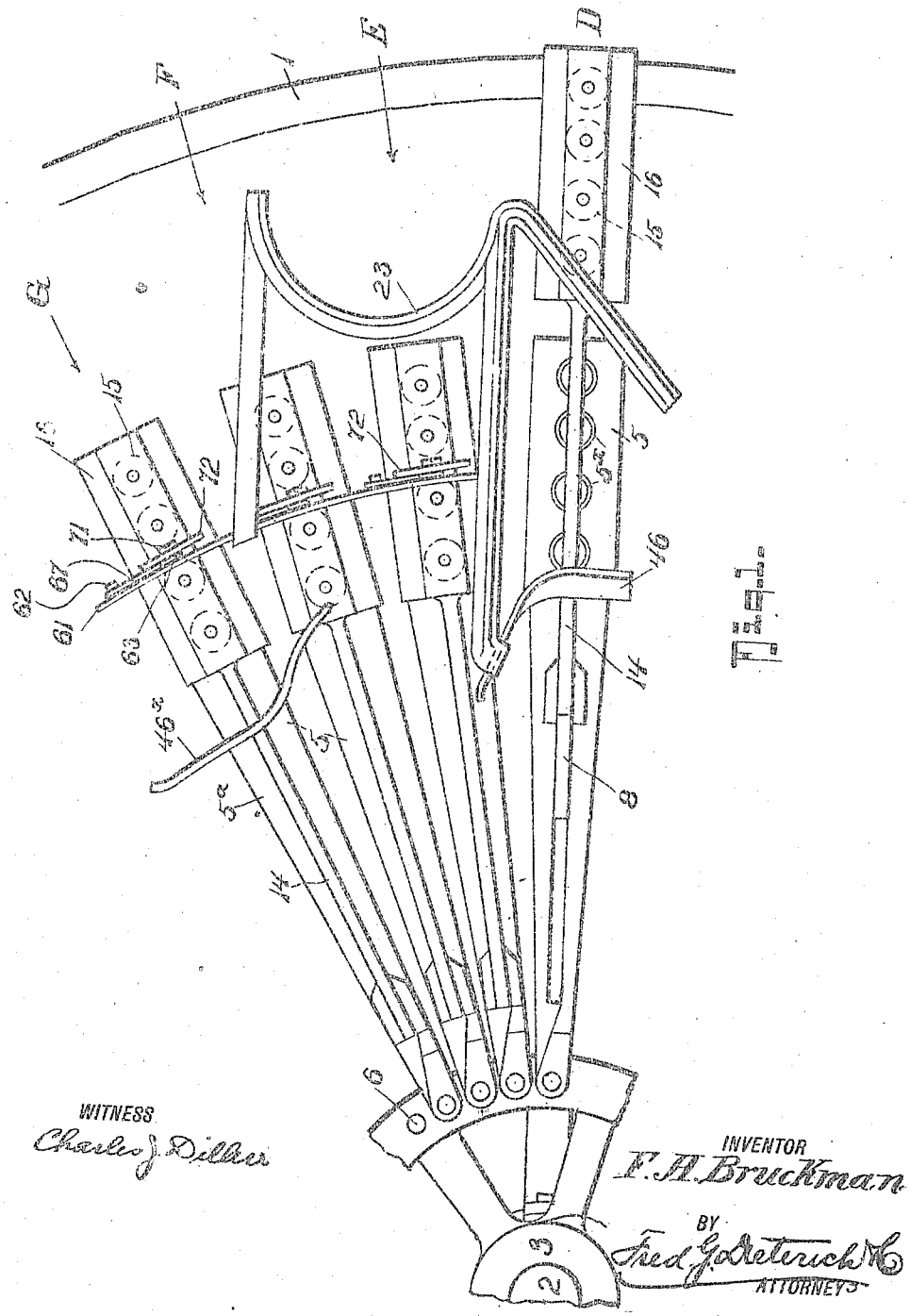

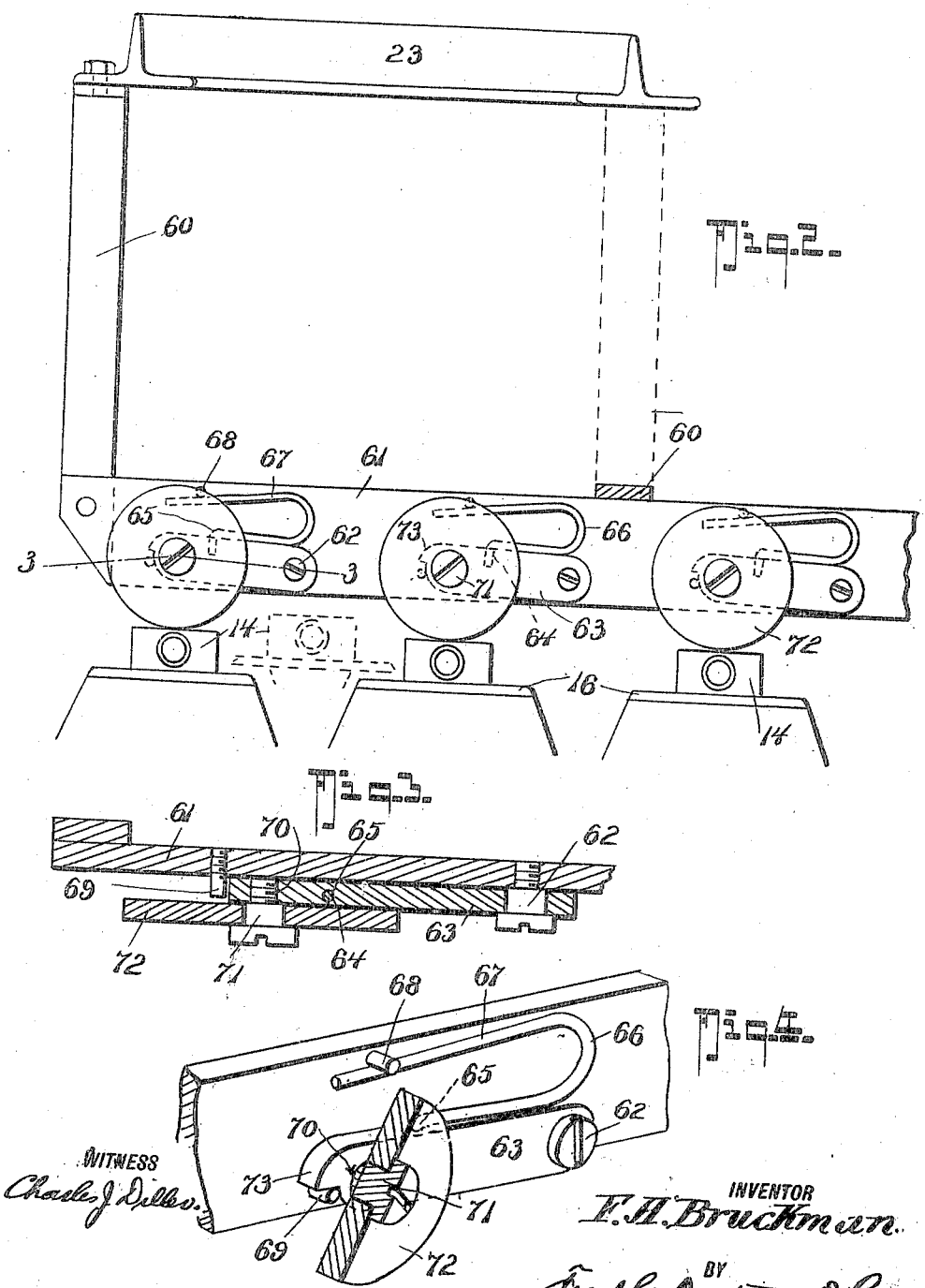

FREDERICK A. BRUCKMAN, OF PORTLAND, OREGON.

PASTRY-MAKING MACHINE.

1,216,274.   Specification of Letters Patent.   Patented Feb. 20, 1917.

Application filed June 2, 1916.   Serial No. 101,273.

*To all whom it may concern:*

Be it known that I, FREDERICK A. BRUCKMAN, residing at Portland, in the county of Multnomah and State of Oregon, have invented a new and useful Improvement in Pastry-Making Machines, of which the following is a specification.

My invention relates especially to the art of machinery for the manufacture of ice cream cone pastry cups or other similar molded and baked articles and the present invention has for its object to provide certain new and useful improvements on the machines disclosed by my prior patents, among which may be mentioned Patent No. 1,071,027, issued August 26, 1913; and Patent No. 1,075,625, issued October 14, 1913.

In the first of the above mentioned patents, no special provision is made for the escape of the steam and vapors at the commencement of the baking operation.

In the second of the above mentioned patents, I have provided a curved trackway, referred to in the said patent by the reference numeral 260, the object of which is to allow the core bars to be raised by the pressure within the molds at intervals during the commencement of the baking act, to alternately allow the escape of the steam and reseat the cores in the molds, so that a semiplastic batter may retain its molded form during the operation of releasing the steam.

My present invention is a modification of the means shown in Patent No. 1,075,625 for allowing the escape of the steam referred to and, in the present invention, this is accomplished by providing a series of yieldable rollers which are designed to engage and press down the core bars at the stop positions immediately following the loading position and to release the core bars during their travel from one such stop position to the next succeeding position, the final pressure roller coming into action after the escape of the steam to finally seat the core bar in the mold where it remains during the time of the baking operation.

The invention also resides in those novel details of construction, combination and arrangement of parts, all of which will be fully described and then be specifically pointed out in the appended claims, reference being had to the accompanying drawings, in which:

Figure 1 is a plan view of a portion of a machine such as disclosed in my patents above referred to and showing the location of the improvements which constitute the present invention.

Fig. 2 is an enlarged elevation and part section of the improvements constituting the invention, portions of the molds and core bars being indicated in full lines in the "stop" positions and in dotted lines in the intermediate positions through which the molds are moved.

Fig. 3 is a horizontal section on substantially the line 3—3 of Fig. 2.

Fig. 4 is a detail perspective view and part section showing one of the core bar pressure members.

In the drawings in which like numerals of reference designate like parts in all the figures, 1 is the standard base on the center 2 of which the rotatable wheel is mounted. The wheel 3 has a rim on which are studs 6 to which the arms $5^a$ of the molds 5 are pivoted to open scissor fashion. The molds 5 have mold cavities $5^x$ shaped to form the desired article (in this case, ice cream cones) and the molds are provided with the usual opening and closing and locking devices illustrated in my patents above referred to (not shown in the present drawings).

The cores 15 are mounted on the usual core bar 14 which is connected to the wheel frame by the usual link 8, so that the cores may be lifted out of the molds and dipped into the usual batter tank (not shown) by the usual core lifting and loading mechanism.

46 and $46^x$ designate the usual core unlocking and relocking guides that coöperate with the core latching devices 13 (see Patent No. 1,071,027 above referred to).

In Fig. 1 of the drawings, the position marked D is the loading position of the wheel and the positions E, F and G respectively are the three succeeding stop positions during which the baking operation is initiated and it is during this time that the formation of steam is at its height.

In order that the core bars may be allowed to rise by the steam pressure, they are not locked until position G is reached but the core bars are alternately pressed down at positions E and F and released between positions E—F and F—G, to permit the escape of steam. This is accomplished by providing a bar 61 which is supported by standards and braces 60 from the frame 23. The bar 61 is provided with pivot pin 62 on which are fulcrumed levers 63 that have shoulders 73 to engage stop pins 69 when the pressure rollers 72 are not in engagement with the core bars 14.

The levers 63 are pressed downwardly by the tie springs 66, one arm of which is bent at 65 to enter a recess 64 in the respective lever 63 while the other arm 67 of the spring lies under a stop pin 68 on the bar 61. The levers 63 are bored and tapped at 70 to receive the bearing screw 71 on which the respective pressure roller 72 is journaled.

16 designate the usual oven covers carried by the core bars 14.

In operation, after the mold has been loaded at position D, the wheel is turned one step until the mold arrives at position E at which time the core bar will receive pressure from the spring 66 through the pressure rollers 72 at position E, thus forcing the core bar downwardly and inserting the cores to their fullest extent into the cavities. As the wheel is turned another step to bring the particular mold to position F, it will have to pass from beneath the roller 72 at position E and at this time the steam pressure will raise the core bar as indicated in dotted lines in Fig. 2, thus permitting the escape of the steam. As position F is reached, the core bar will be again forced down into its closed position and again released after it passes position F on its way to position G, so that any further formation of steam may be relieved between positions F and G before the final closing pressure is applied by the roller 72 at position G and the core locking devices have been reset.

From the foregoing description taken in connection with the accompanying drawings, it is thought that the complete structure, operation and advantages of the invention will be clear to those skilled in the art.

What I claim is:

1. In a machine of the character stated, the combination with the rotatable carrier, the molds and the core bars carried thereby; of a core bar presser for pressing said bars on the molds, said presser comprising a supporting bar, a lever pivoted to said supporting bar, a presser roller carried by said lever, a spring for forcing said lever down and a stop for limiting the downward movement of said lever, substantially as shown and described.

2. The combination with the intermittently movable molds and core bars therefor; of a bar located above the molds in the direction of travel, a series of yieldably supported core bar pressers mounted on said bar and adapted to engage said core bars as the same are moved beneath the pressers, to force the cores into the molds, said core bars being free to lift when between adjacent pressers of the series, said yieldably supported core bar pressers comprising levers pivoted to said bar, springs for forcing said levers to the pressing position, stops for limiting the movements of said levers, and presser rollers carried by said levers.

FREDERICK A. BRUCKMAN.